March 27, 1956 R. A. FANTI ET AL 2,739,770
AIRFOIL ANTI-FLUTTER DEVICE
Filed Nov. 14, 1952 2 Sheets-Sheet 1
FIG. 1
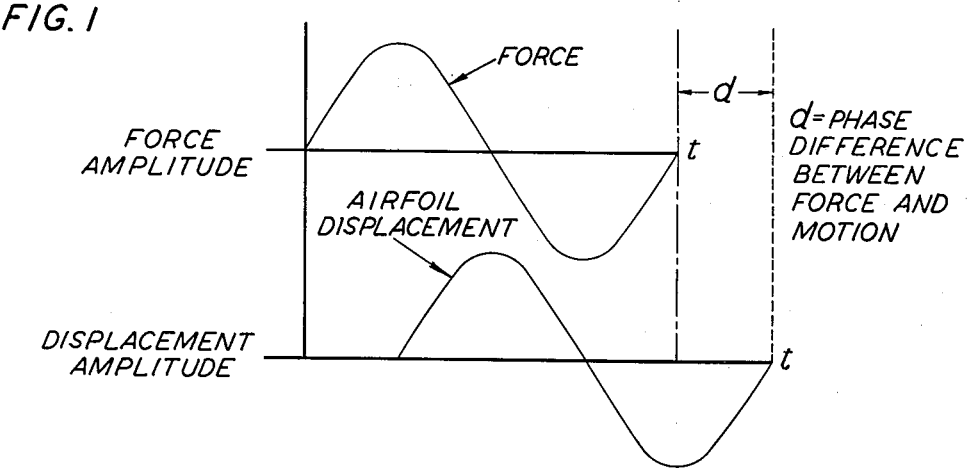
FIG. 2
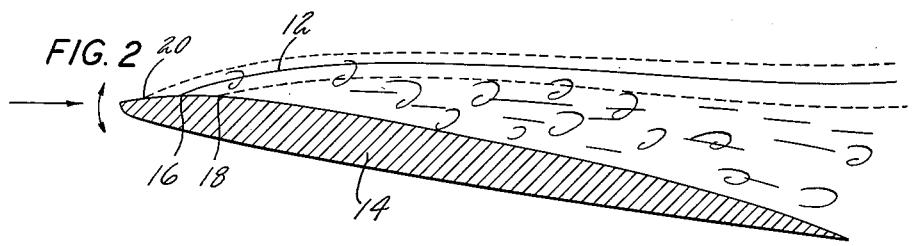
FIG. 3
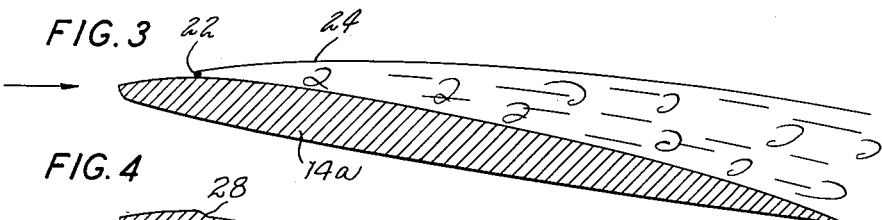
FIG. 4
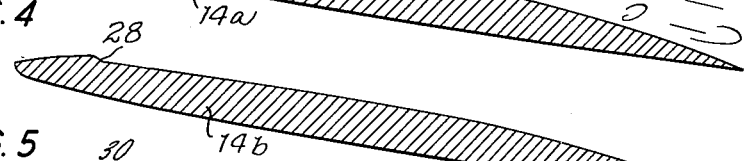
FIG. 5
FIG. 6
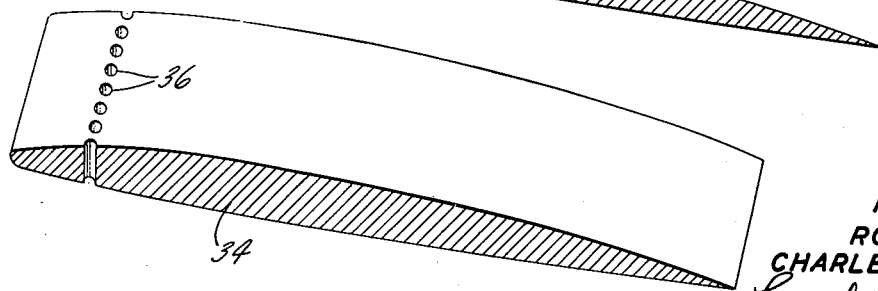
INVENTORS
ROY A. FANTI
CHARLES B. SMITH
BY Leonard F. Weklund
ATTORNEY

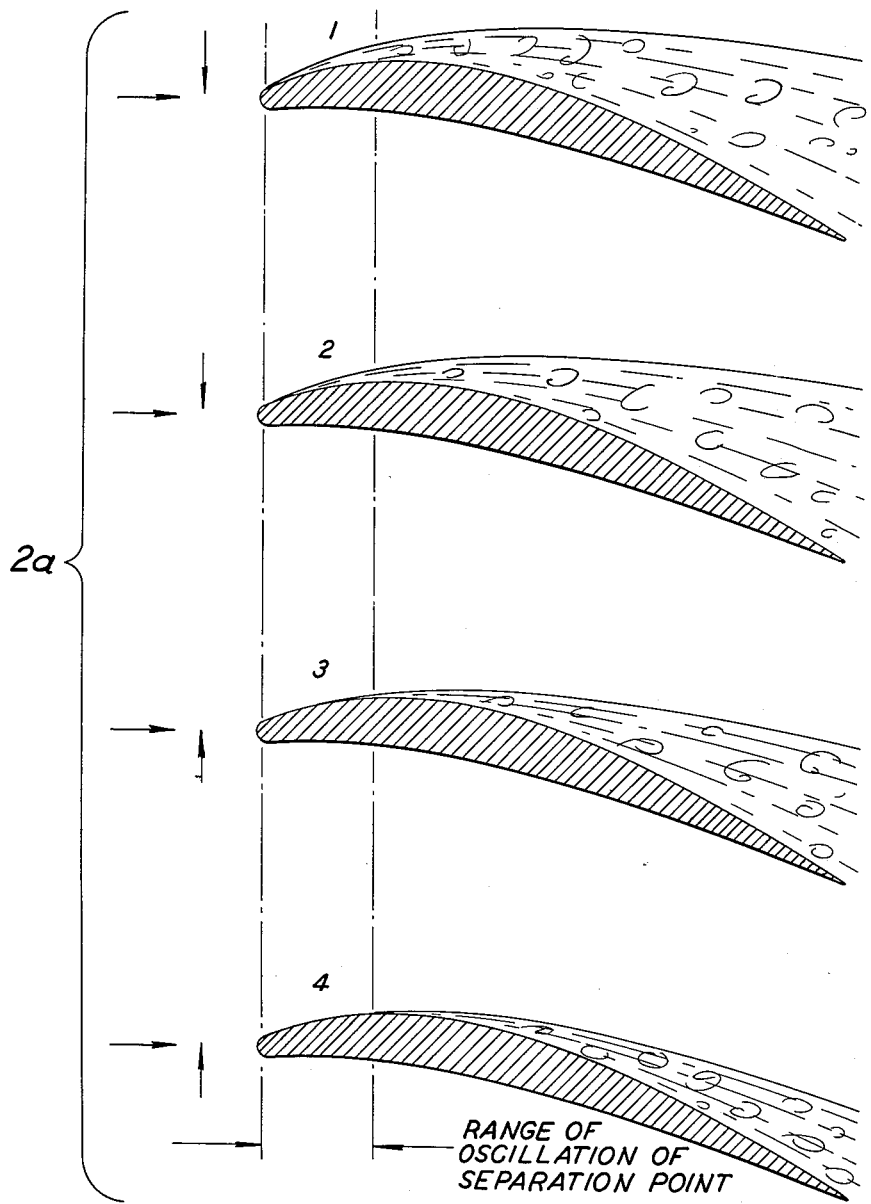

United States Patent Office 2,739,770
Patented Mar. 27, 1956

2,739,770

AIRFOIL ANTI-FLUTTER DEVICE

Roy A. Fanti, Springfield, Mass., and Charles B. Smith, Windsor, Conn., assignors to United Aircraft Corporation, East Hartford, Conn., a corporation of Delaware Application November 14, 1952, Serial No. 320,516

2 Claims. (Cl. 244—41)

This invention relates to a device for preventing the stall flutter of airfoils.

It is known that airfoils in a flowing airstream may be subject to an aeroelastic flutter which may damage or destroy the structure. Said flutter can occur in wings, and propeller, compressor and turbine blades. It may be avoided by providing sufficient rigidity or avoiding the critical operating ranges. Either procedure may involve operational penalties.

The object of the invention described herein is to prevent flutter without introducing weight or operational restrictions.

This and other objects of this invention will become readily apparent from the following detail description of the drawings in which:

Fig. 1 illustrates the force displacement relationship necessary to produce flutter. Flutter may occur when the force leads the displacement on a time scale.

Fig. 2 illustrates the movement of the separation point on an oscillating airfoil. It is this movement which causes the aerodynamic force to lead the displacement which in turn causes flutter.

Fig. 2a illustrates a series of conditions as observed in tests.

Fig. 3 illustrates an oscillating airfoil on which the separation point has been stabilized and flutter thus prevented.

Figs. 4 to 6 are modifications of the Fig. 3 construction.

It is known that in order for flutter to exist it is necessary that the aerodynamic forces acting on the airfoil be out of phase with the motion of the airfoil as shown in Fig. 1. This out of phase condition enables energy to be absorbed from the airstream and causes a flutter.

This phase difference, which induces flutter, is caused by a chordwise oscillation of the separation point of the air from the airfoil. As shown in Fig. 2, the line 12 denotes the static flow separation line which may normally exist for an airfoil such as 14. The separation point can then be denoted by 16 in the figure. It has been determined that the phase difference mentioned is caused by a chordwise oscillation of the separation point or that the separation point moves from a point such as 18 to a point such as 20 on the upper surface of the airfoil 14 as the airfoil oscillates.

As an example of actual test observations Fig. 2a illustrates four conditions existing during a typical flutter cycle. Positions 1 and 2 are typical of conditions during two stages in the downward movement of the airfoil while positions 3 and 4 are typical conditions during two stages in the upward movement of the airfoil. The illustrated stages are not intended to show conditions at any beginning or end of a flutter cycle but are merely examples for illustration. The conditions may in fact be exaggerated somewhat for clarity.

The fundamental principle of this invention then is in the conception and discovery that the flutter condition of an airfoil may be prevented or delayed by means of stabilizing the separation point. It has been found that by stabilizing this point of separation on the airfoil the phase difference mentioned above in connection with Fig. 1 is removed or interrupted so as to provide flutter free operation. Hence when the point of separation is fixed the aerodynamic forces are stabilized so as to put them in phase with the airfoil motion.

Fig. 3 illustrates a tripper device in the form of a wire 22 running spanwise of the airfoil 14a. This tripping device is not of the type which will cause separation at low angles of attack but is merely of sufficient size to stabilize the point of separation once it has occurred.

Under certain conditions it may not be necessary that the tripping device completely span the airfoil since it may be found that only a partial spanwise tripping is necessary to stabilize the separation point over the airfoil. When speaking of the separation point it is to be understood that this is a point when considering a cross section of an airfoil but that it is a line of separation when considering the span of the airfoil.

The form of the particular flow diverting device may take any of a number of configurations just as long as some discontinuity in pressure occurs at the point that stabilization of the separation point is desired. Thus, an airfoil 14b as shown in Fig. 4 with a portion of its upper surface indented as at 28 may be desirable. Likewise, a notch such as 30 on the airfoil 14c in Fig. 5 may be found expedient. As illustrated in Fig. 6, the airfoil 34 may include a plurality of passages 36 leading from the under surface to the upper surface of the airfoil. Thus, due to the high pressure on the under side of the surface a certain flow of air will move to the upper surface which is of lower pressure so as to form a discontinuity in the pressure on the upper surface. These holes 36 may also take the form of a spanwise slot.

The particular tripping device, while stabilizing the position at which the flow separates from the airfoil, may also stabilize the position of weak oscillating shock which has been known to develop on the airfoil surface when the free stream velocity is such that approximately unity Mach number is obtained locally along the chord of the airfoil. By stabilizing local shocks in this manner flutter is also deterred.

The position, size and construction of the particular tripping device depends upon the particular airfoil section that is used and the range of angle of incidence and Mach number in which flutter free operation is required or desired. However, the location of the device in certain chordwise ranges will depend upon the thickness of the airfoil. The thickness ratio of an airfoil may be defined as the thickness at any section divided by the chord dimension at that section. Thus for a thickness ratio of approximately 6% the tripping device will be located within the forward 15% of the chord. For thicker airfoils such as for example having a 9% thickness ratio, the location of the tripper may be approximately at the 25% chord position while greater thickness ratios will require tripper positions in the mid chord range, i. e., 40% to 60%. It may suffice to say that for thickness ratios above 6% the tripper will be located aft of the 15% chord position but not beyond the point of maximum thickness.

As a result of this invention it will be apparent that a particularly simple but highly efficient device has been provided in order to solve the problem of flutter in airfoils.

Although only certain embodiments of this invention have been illustrated and described herein, it will be apparent that various changes and modifications may be made in the arrangement and construction of the parts without departing from the scope of this novel concept.

What it is desired to obtain by Letters Patent is:

1. In combination, an airfoil having a fluid stream flowing thereover, which stream has a separation line running substantially parallel to the spanwise axis of said airfoil, said stream inducing flutter in said airfoil in the form of flapping and pitching motion, said flutter being accompanied by the chordwise oscillation within a predetermined range of the line of fluid separation from the upper airfoil surface, and means for eliminating said flutter and preventing oscillation of said separation line including a flow interrupting device on the upper surface of said airfoil running parallel to the spanwise axis of said airfoil over a major portion of the span of said airfoil, said device being located forward of the 15% chordwise dimension of the airfoil when said airfoil has a thickness ratio of less than approximately 6%.

2. In combination, an airfoil having a fluid stream flowing thereover, which stream has a separation line running substantially parallel to the spanwise axis of said airfoil, said stream inducing flutter in said airfoil in the form of flapping and pitching motion, said flutter being accompanied by the chordwise oscillation within a predetermined range of the line of fluid separation from the upper airfoil surface, and means for eliminating said flutter and preventing oscillation of said separation line including a protuberance on the upper surface of said airfoil running parallel to the spanwise axis of said airfoil over a major portion of the span of said airfoil, said protuberance being located forward of the 15% chordwise dimension of the airfoil when said airfoil has a thickness ratio of less than approximately 6%.

References Cited in the file of this patent

UNITED STATES PATENTS

| | | |
|---|---|---|
| 1,361,277 | Mott | Dec. 7, 1920 |
| 1,549,223 | Schleusner | Aug. 11, 1925 |
| 1,815,489 | Albers et al. | July 21, 1931 |
| 1,893,064 | Zaparka | Jan. 3, 1933 |
| 2,026,482 | Mattioli | Dec. 31, 1935 |
| 2,334,070 | Conley | Nov. 9, 1943 |

FOREIGN PATENTS

| | | |
|---|---|---|
| 192,568 | Great Britain | Feb. 8, 1923 |
| 459,629 | France | Sept. 10, 1913 |
| 511,650 | Great Britain | Aug. 22, 1939 |
| 929,942 | France | July 28, 1947 |